United States Patent
Poole

(10) Patent No.: US 6,293,353 B1
(45) Date of Patent: Sep. 25, 2001

(54) HIGH MOBILITY AGRICULTURAL IMPLEMENT

(75) Inventor: Gerald W. Poole, Bolingbrook, IL (US)

(73) Assignee: Case Corporation, Racine, WI (US)

( * ) Notice: Subject to any disclaimer, the term of this patent is extended or adjusted under 35 U.S.C. 154(b) by 0 days.

(21) Appl. No.: 09/468,961

(22) Filed: Dec. 22, 1999

Related U.S. Application Data

(60) Provisional application No. 60/113,490, filed on Dec. 22, 1998.

(51) Int. Cl.[7] ................................................. A01B 15/14
(52) U.S. Cl. ............................. 172/776; 172/311; 16/366
(58) Field of Search .................... 172/311, 616, 172/617, 456, 459, 452, 310, 776; 16/287, 302, 221, 365, 366, 367, 368, 311

(56) References Cited

U.S. PATENT DOCUMENTS

| | | |
|---|---|---|
| 475,271 | 5/1892 | Ericson . |
| 3,505,704 | 4/1970 | Hornung et al. . |
| 3,692,121 * | 9/1972 | Kenney ................................ 172/456 |
| 3,713,495 * | 1/1973 | Redford .............................. 172/456 |
| 3,785,441 * | 1/1974 | Sosalia ................................ 172/311 |
| 4,050,523 * | 9/1977 | Poland ................................ 172/311 |
| 4,074,766 * | 2/1978 | Orthman ............................. 172/311 |
| 4,126,189 * | 11/1978 | Channel .............................. 172/456 |
| 4,206,816 * | 6/1980 | Richardson et al. ............... 172/311 |
| 4,328,869 * | 5/1982 | Perelli ................................. 172/311 |
| 4,337,548 | 7/1982 | Bonar . |
| 4,342,367 * | 8/1982 | Gates .................................. 172/776 |
| 4,415,043 * | 11/1983 | Hadler et al. ....................... 172/776 |
| 4,418,763 * | 12/1983 | Boetto ................................ 172/776 |
| 4,535,848 * | 8/1985 | Pfenninger et al. ................ 172/311 |
| 4,561,505 * | 12/1985 | Williamson ........................ 172/776 |
| 4,596,290 | 6/1986 | Bedney . |
| 4,632,417 | 12/1986 | Hodapp . |
| 4,658,911 * | 4/1987 | Drever et al. ...................... 172/776 |
| 4,676,321 | 6/1987 | Friggstad . |
| 4,790,389 | 12/1988 | Adee et al. . |
| 4,878,545 * | 11/1989 | Dyken ................................ 172/776 |
| 4,923,017 * | 5/1990 | Meek et al. ........................ 172/776 |
| 5,558,164 | 9/1996 | Clymer . |
| 6,082,467 * | 7/2000 | Friesen ............................... 172/630 |
| 6,092,609 * | 7/2000 | Jeffery et al. ...................... 172/311 |

* cited by examiner

*Primary Examiner*—Victor Batson
(74) *Attorney, Agent, or Firm*—Foley & Lardner

(57) ABSTRACT

An implement supports several ground cultivating tools on a main toolbar and at least one wing toolbar. The two are coupled together by two pivot brackets attached to the outer end of the main toolbar and the inner end of the wing toolbar. The pivot brackets are coupled to the main toolbar and the wing toolbar to permit the wing toolbar to pivot upwardly and downwardly with respect to the main toolbar. When the wing toolbar pivots upwards with respect to the main toolbar, it pivots about an upper point or axis and when it pivots downwards with respect to the main toolbar it pivots about a lower point or axis below the upper point or axis.

3 Claims, 5 Drawing Sheets

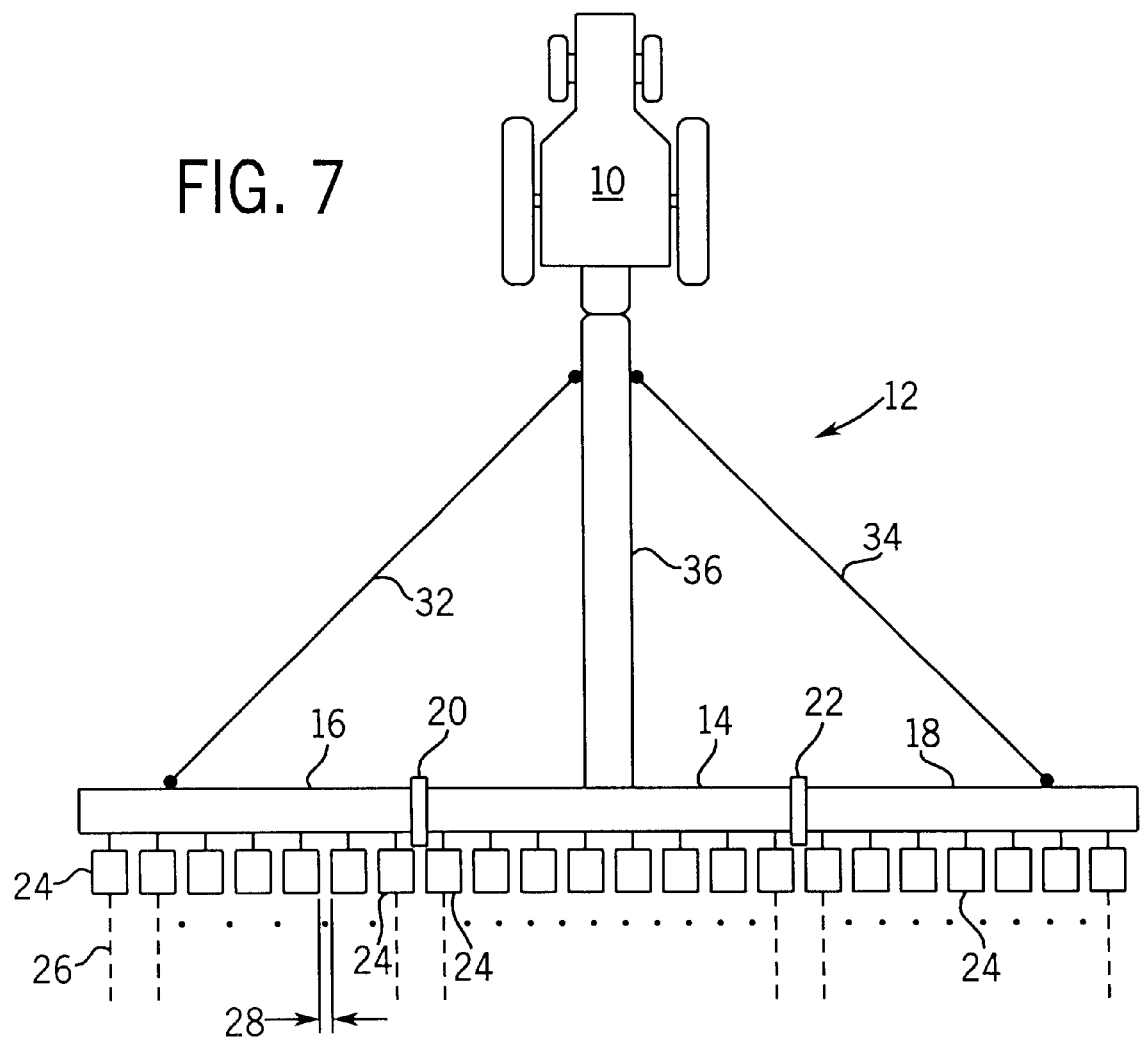

HIGH MOBILITY AGRICULTURAL IMPLEMENT

FIELD OF THE INVENTION

This application claims the benefit of U.S. Provisional Application No. 60/113,490, filed Dec. 22, 1998, and is an application for patent which relates to implements or agricultural implements. More particularly it relates to agricultural implements formed in several sections and joined by flexible couplings.

BACKGROUND OF THE INVENTION

With the increasing horsepower of modern tractors and the constant pressures of agricultural efficiencies, agricultural implements such as plows, rakes, harrows, disks, planters and the like have been increasing in their lateral dimensions. With the increased horsepower of the pulling implement of the tractor, more rows in a field can be cultivated simultaneously. Unfortunately, agricultural fields are uneven. As the implements increase in their lateral dimensions they do not follow the changing contours of the ground as accurately, leading to over- or under-penetration by ground-cultivating devices attached to the implement. For this reason in recent years the implements have been designed in several sections disposed along a line perpendicular to the direction of travel and connected to each other through generally flexible couplings disposed between the sections. The flexible couplings allow small upward or downward deflections between the sections of the implement as it travels over the ground, thus permitting each section to follow the contours of the field more accurately, and providing more even ground penetration by the attached devices.

There has been a trend in recent years to plant crops in rows spaced ever more closely together. As a result, each of the ground-cultivating devices such as row units for planting seed are spaced closer together on each section of the implement's tool bar. Given row spacings of fifteen inches, for example, the row units on a planter would be spaced fifteen inches apart, thereby providing a gap of only one to two inches between adjacent row units on adjacent sections of the tool bar. If such a coupling is used, there is a real danger that as one section of the tool bar is flexed upward or downward over a ground contour that it will cause adjacent row units to contact each other and break. What is needed, therefore, is an improved agricultural implement that will permit greater relative motion between adjacent sections of the implement while reducing the risk of damaging ground cultivating devices, such as row units, mounted on those sections. It is an object of this invention to provide such an implement

BRIEF DESCRIPTION OF THE DRAWINGS

FIG. 7 is a top view of an agricultural implement drawn by a tractor and having several laterally disposed sections that are jointed by flexible couplings;

FIG. 8 illustrates a prior art flexible coupling joining two adjacent tool bars;

Figure 1:
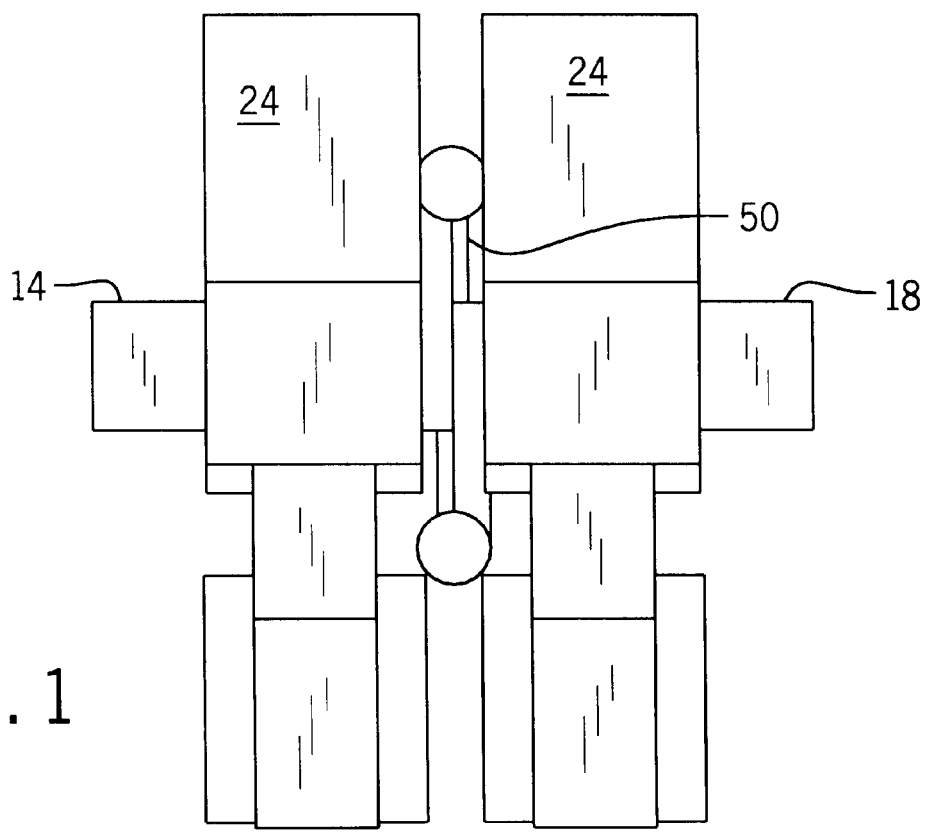
FIG. 1 shows an implement's row units coupled thereto where the two tool bars are coupled together using a high mobility flexible coupling in accordance with the present invention.

Before explaining at least one embodiment of the invention in detail it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION OF THE PREFERRED EMBODIMENTS

Referring to FIG. 7, a tractor 10 is shown towing an implement 12 that is comprised of three tool bars, a main tool bar 14 and two wing tool bars 16 and 18 that are coupled to the main tool bar via flexible couplings 20 and 22, respectively. Several row units 24 (exemplary of the wide variety of ground cultivating devices that could be attached to the sections of an implement) are mounted on each of the tool bars. These row units are aligned on fifteen inch centers across the width of the three tool bars to thereby define several equally spaced rows 26 that are cultivated in the field. These row units typically have a width of ten to fourteen inches, thereby typically providing a gap 28 between each adjacent pair of row units of one and three inches.

Prior art flexible couplings 20, 22 have been made with a single pivot point 30 as shown in FIG. 8. This pivot point 30 was typically defined by a steel pin passing through holes in the ends of the tool bars to permit slight upward or downward pivoting of the wing tool bars 16, 18 with respect to the main tool bar 14. Due to their fixed pivot position, they permit adjacent row units (not shown) mounted on either side of the pivot 30 to collide when wing tool bar 18 is moved upward or downward with respect to main tool bar 14. Leading links 32 and 34 are coupled to wing tool bar 16 and 18, respectively, and to tongue 36 of implement 12 to prevent the wing tool bars from being bent backwards as the implement is towed through the field.

Figure 2:
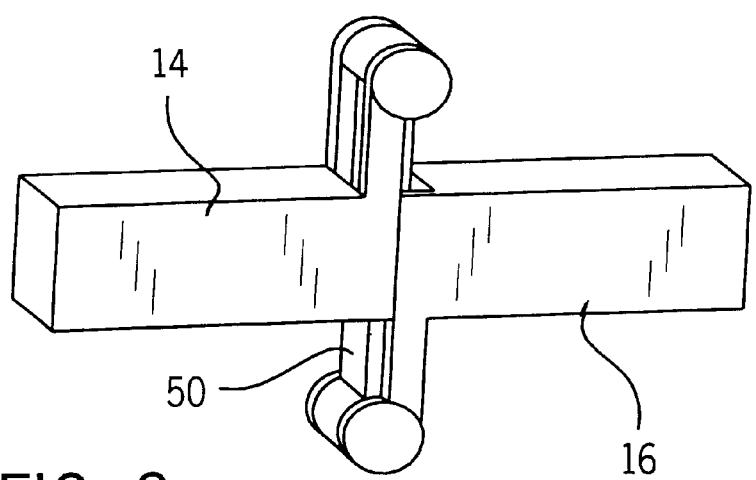
FIG. 2 illustrates the main tool bar, the wing tool bar and the coupling with the row units removed for clarity.
Figure 4:
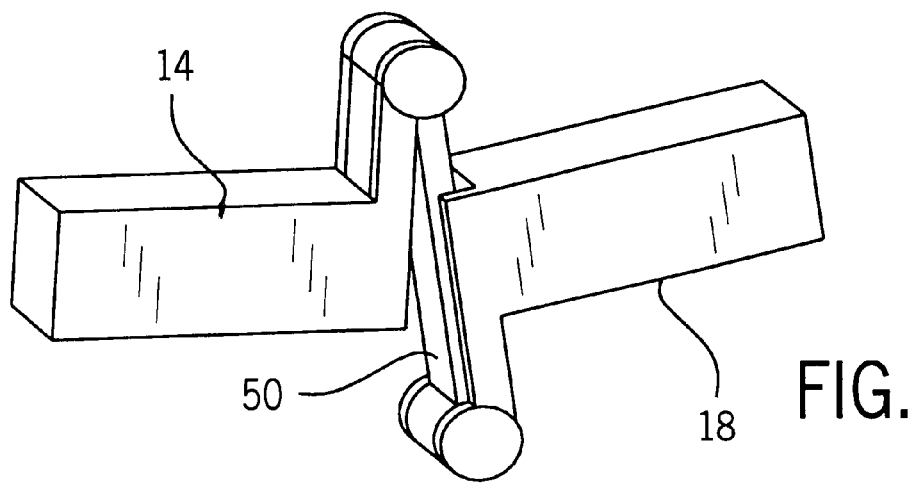
FIG. 4 shows the arrangement of FIG. 2 with the wing tool bar pivoted upwards.
Figure 6:
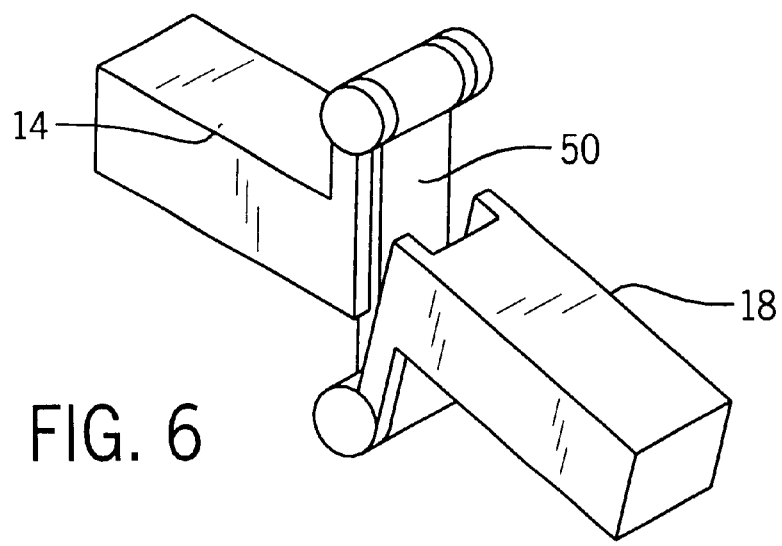
FIG. 6 illustrates the tool bars and coupling of FIG. 5 with the row units removed for clarity.
Figure 9:
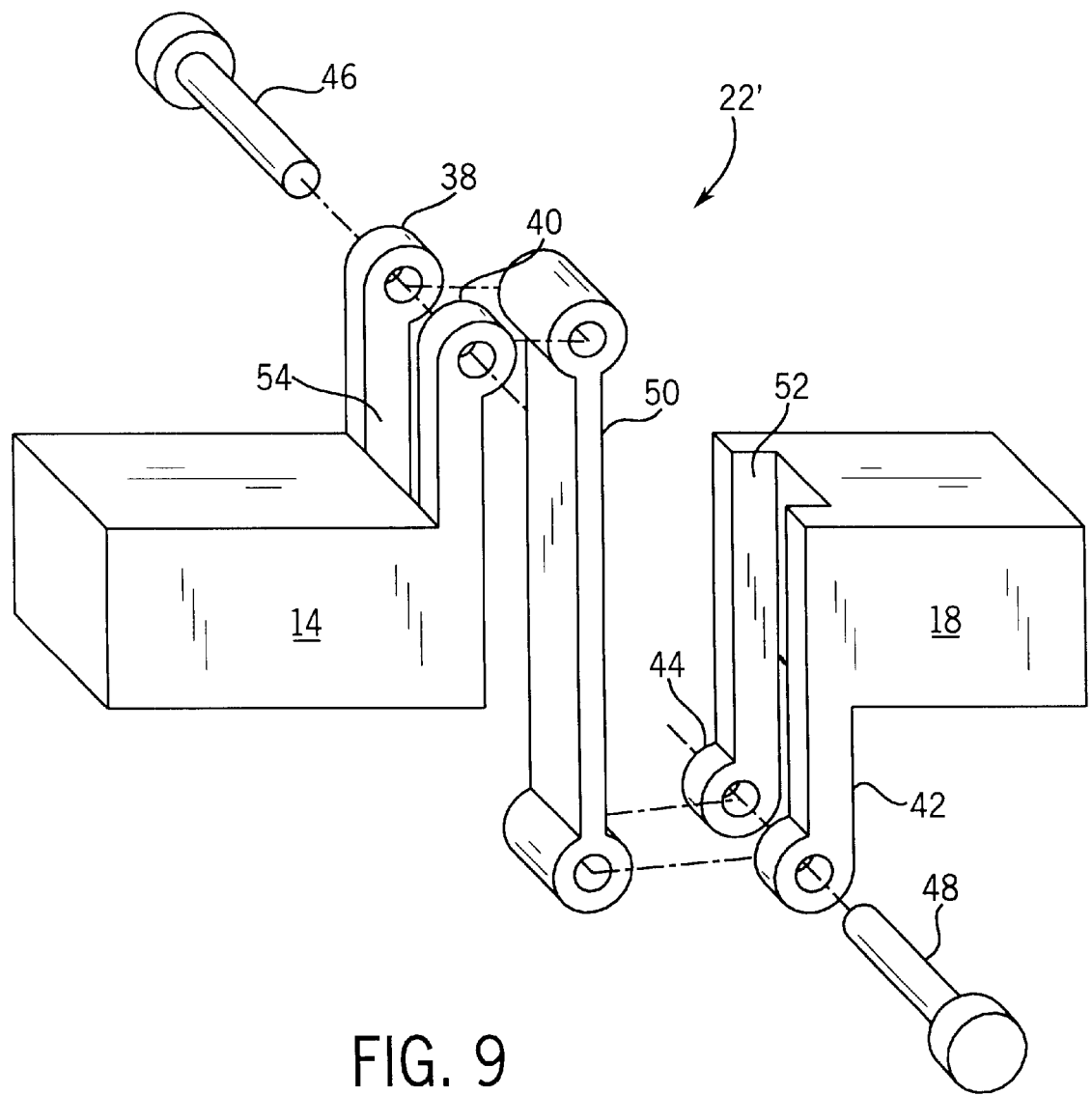
FIG. 9 is an exploded view of the high mobility flexible coupling.

FIG. 9 shows a high mobility flexible coupling 22' for joining the ends of main tool bar 14 and wing tool bar 18 that improves upon the prior art coupling of FIG. 8 by providing a plurality of pivot points. This coupling includes elongate members 38 and 40 extending upward from tool bar 14 and elongate members 42 and 44 extending downward from wing tool bar 18. Elongate members 38 and 40 have holes through an upper portion that define and support pin 46 and elongate members 42 and 44 have holes to a lower end thereof that define pin supports for pin 48. An elongate link 50 extending approximately perpendicularly to the longitudinal extent of main tool bar 14 and wing tool bar 18 is disposed between main tool bar 14 and wing tool bar 18 and is coupled to the elongate members. Pin 46 passes through elongate members 38 and 40 and through a hole in the upper end of link 50 to define a pivotal relationship between link 50 and main tool bar 14. The axis of relative rotation defined by this pivot is substantially horizontal. Pin 48 similarity passes through the holes in the lower ends of elongate members 42 and 44 and through a hole in a lower end of link 50 to define a pivotal relationship between the lower end of link 50 and wing tool bar 18. The axis of relative rotation defined by this pivot is substantially horizontal. Recesses 52 and 54 are provided between elongate members 42 and 44 and 38 and 40 on the ends of tool bars 18 and 14, respectively, to support the sides of link 50 which is sized to fit into these recesses when main tool bar 14 and wing tool bar 18 are substantially parallel. FIGS. 2, 4 and 6 show that the assembly pivots about a top and a bottom pivot point when wing tool bar 18 is pivoted upward or downward with respect to the main tool bar 14.

Figure 3:
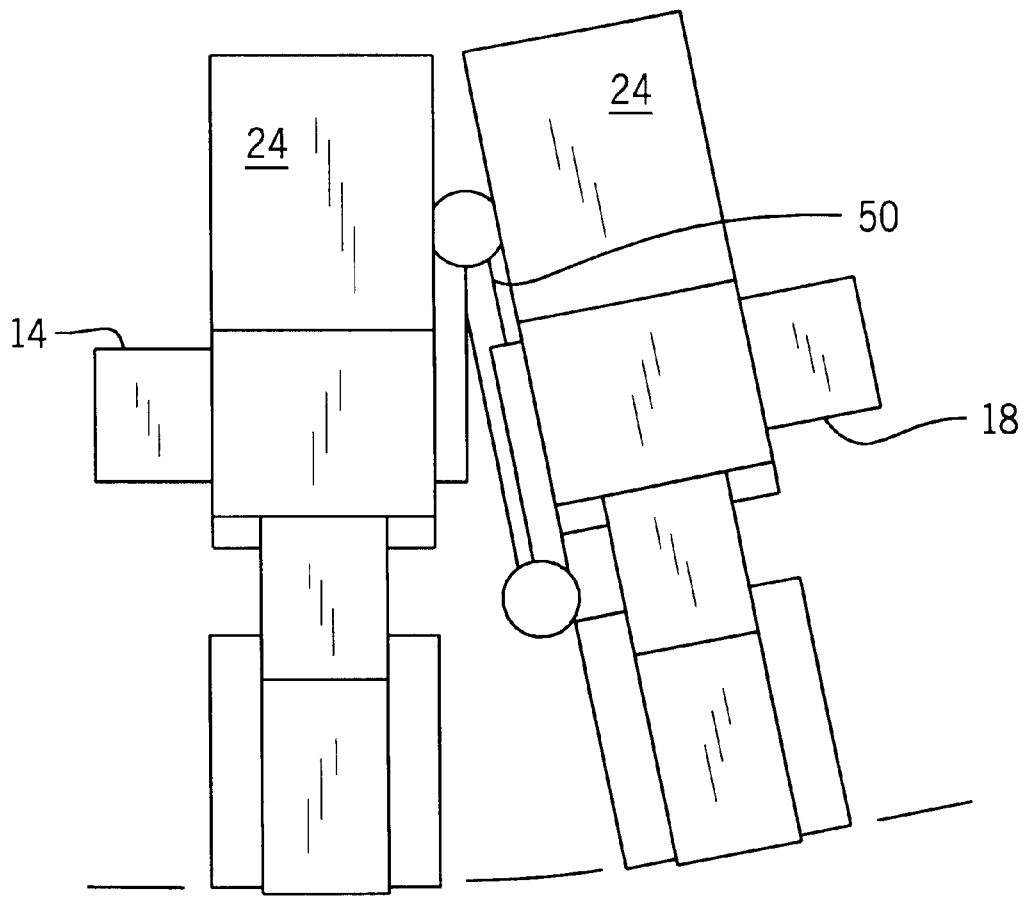
FIG. 3 illustrates the arrangement of FIG. 1 where the wing tool bar is pivoted upward with respect to the main tool bar due to changes in ground contours.
Figure 5:
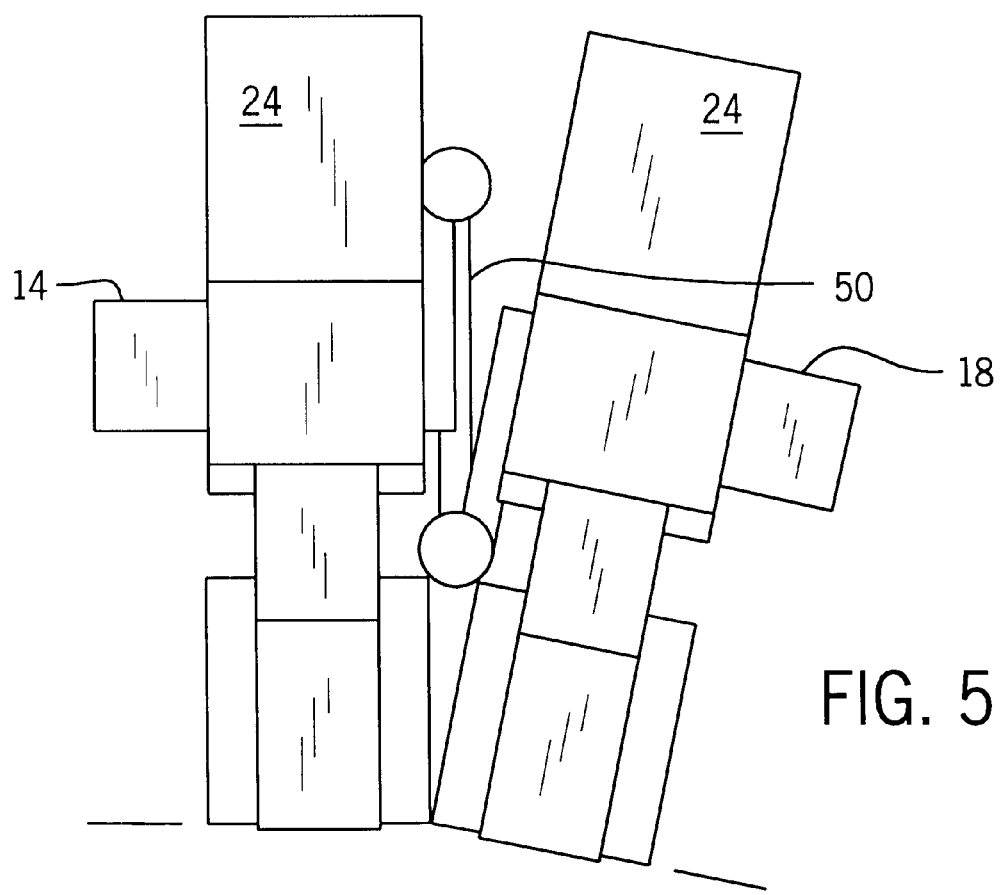
FIG. 5 shows the arrangement of FIG. 1 with the wing tool bar pivoted downwards due to changes in ground contour.

FIGS. 1, 3 and 5 illustrate a rear view of implement 12 in the vicinity of the flexible coupling 22' (as shown in FIG. 7) and show a portion of main tool bar 14, wing tool bar 18 and two row units 24, one mounted on each of main tool bar 14 and wing tool bar 18. In FIG. 1, the position of the flexible coupling is shown when main tool bar 14 and wing tool bar 18 are parallel and colinear. FIG. 2 shows the relative positions of main tool bar 14 and wing tool bar 18 when an outer end of wing tool bar 18 is pivoted upward with respect to main tool bar 14. FIG. 5 illustrates the relative positions of main tool bar 14 and wing tool bar 18 when an outer end of wing tool bar 18 is pivoted downward with respect to main tool bar 14. As can be seen in these three views, when wing tool bar 18 is pivoted upward with respect to main tool bar 14 (FIG. 3) the two tool bars pivot with respect to each other around a top pivot. By pivoting relative to each other about a top pivot point disposed above the center line of main tool bar 14 and wing tool bar 18, wing tool bar 18 can rise higher in the air, and be disposed at a greater upward angle with respect to main tool bar 14 without causing contact between the two adjacent row units 24 as compared to the prior art pivot of FIG. 8. In a similar manner, FIG. 5 shows that wing tool bar 18 pivots with respect to main tool bar 14 a pivot point below the top pivot point when an outer end of wing tool bar 18 is lowered. By pivoting with respect to each other about a pivot point disposed below the top pivot point, wing tool bar can rotate downwardly with respect to main tool bar 14 without causing interference or contact between the two adjacent row units 24 to a greater extend than provided by the prior art flexible coupling of FIG. 8. In this manner, a high mobility agricultural implement employing high mobility flexible coupling 22' provides superior performance and ground contour following ability than an implement equipped with the coupling of FIG. 8.

The flexible coupling of FIGS. 1–6 and 9 can be used in implement 12 in place of couplings 20 and 22, instead of the prior art coupling shown in FIG. 8. The example described above shows upwardly extending members from tool bar 14 and downwardly extending members from the wing tool bar connected to it. The coupling could as easily be made with downwardly extending members from main tool bar 14 and upwardly extending members from the wing tool bar to which it is connected. The spacing of the row units is not critical. While the benefits of the flexible coupling are most clear when the row units 24 are spaced on fifteen inch centers, nonetheless, the same benefits can be provided when the row units are spaced farther apart, for example, on twenty to thirty inch centers.

The description above was directed to "row units." Nonetheless, the high mobility flexible coupling described herein is of similar benefit for any implement having different ground cultivating devices coupled to its flexibly coupled sections. For example, disks, rakes, harrows, chemical applicators or other tool bar mounted devices could be substituted for the row units illustrated in the figures.

Thus, it should be apparent that there has been provided in accordance with the present invention a high mobility agricultural implement that fully satisfies the objectives and advantages set forth above. Although the invention has been described in conjunction with specific embodiments thereof, it is evidence that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. An implement for supporting a plurality of ground cultivating implements extending transversely along a line substantially perpendicular to a line of working travel comprising:

a main section having a main tool bar with first and second ends and having a main longitudinal axis that extends substantially perpendicular to the line of working travel;

a first wing section having a first wing tool bar with proximal and distal ends and having a first longitudinal axis that extends substantially perpendicular to the line of working travel wherein the proximal end of the first wing tool bar is coupled to the first end of the main tool bar;

a second wing section having a second wing tool bar with proximal and distal ends and having a second longitudinal axis that extends substantially perpendicular to the line of working travel wherein the proximal end of the second wing tool bar is coupled to the second end of the main tool bar;

a first flexible coupling through which the proximal end of the first wing tool bar is coupled to the first end of the main tool bar;

a second flexible coupling through which the proximal end of the second wing tool bar is coupled to the second end of the main tool bar;

wherein the first flexible coupling includes a first pivot bracket extending substantially vertically and having an upper pivot and a lower pivot vertically opposed on the first pivot bracket pivotally coupled to the first end of the main tool bar and the other of the pivots pivotally coupled to the proximal end of the first wing tool bar and;

wherein the second flexible coupling includes a second pivot bracket extending substantially vertically and having one of the upper pivot and the lower pivot pivotally coupled to the second end of the main tool bar and the other of the ends pivotally coupled to the proximal end of the second wing tool bar.

2. The implement of claim 1, wherein the first flexible coupling defines a first relative rotational position between the main tool bar and the first wing tool bar in which the main longitudinal axis and the first longitudinal axis together define a substantially straight line, and further wherein the first flexible coupling permits relative rotation between the main and first wing tool bars about the upper pivot when the distal end of the first wing tool bar is raised upward from the first relative rotational position, and wherein the first flexible coupling permits relative rotation between the main and first wing tool bars about the lower pivot when the distal end of the first wing tool bar is lowered below the first relative rotational position.

3. The implement of claim 2, wherein the second flexible coupling defines a second relative rotational position between the main tool bar and the second wing tool bar in which the main longitudinal axis and the second longitudinal axis together define a substantially straight line, and further wherein the second flexible coupling permits relative rotation between the main and second wing tool bars about the upper pivot point when the distal end of the second wing tool bar is raised upward from the second relative rotational position, and wherein the second flexible coupling permits relative rotation between the main and second wing tool bars about the lower pivot when the distal end of the second wing tool bar is lowered below the second relative rotational position.

\* \* \* \* \*